Patented Jan. 18, 1944

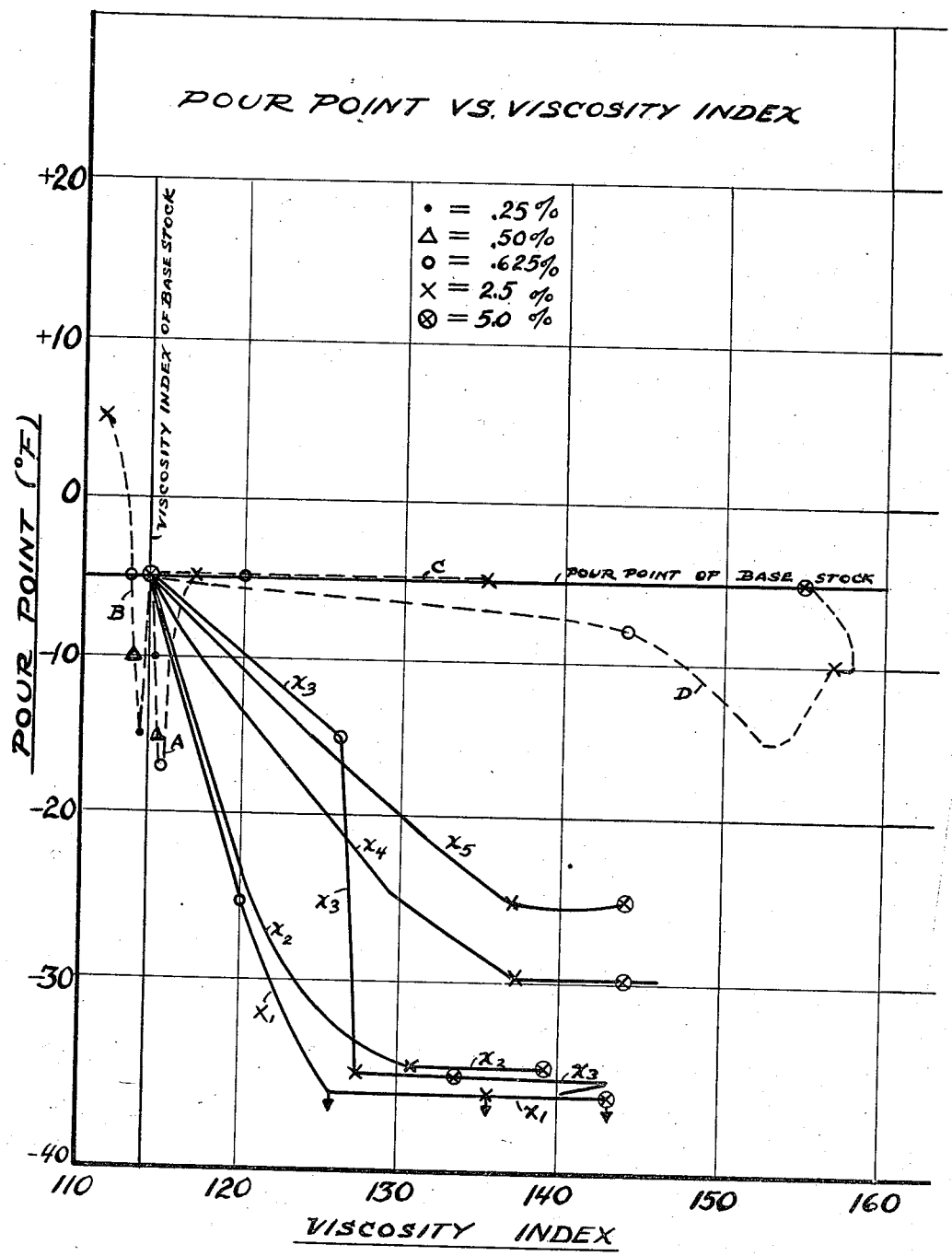

2,339,493

UNITED STATES PATENT OFFICE 2,339,493

CONDENSATION PRODUCT AND METHOD OF PREPARING AND USING SAME

Eugene Lieber, West New Brighton, Staten Island, N. Y., and Martin M. Sadlon, Roselle Park, N. J., assignors, by mesne assignments, to Standard Catalytic Company, a corporation of Delaware Application October 28, 1941, Serial No. 416,827

14 Claims. (Cl. 252—59)

The present invention relates to a novel type of chemical condensation product and to methods of preparing and using same; and more particularly it relates to the production of a product having both the property of reducing the pour point of waxy mineral lubricating oils and also the property of improving the viscosity index of various other hydrocarbon oils and specifically mineral lubricating oils.

In our previous Patent 2,174,246 it was disclosed that the Friedel-Crafts condensation of chlorinated paraffin wax and aromatic compounds, such as naphthalene, could best be carried out for the production of pour depressors for waxy lubricating oils by mixing the naphthalene with the aluminum chloride in a halogenated hydrocarbon solvent, such as tetrachlorethane, and then adding chlorinated wax thereto, the reaction temperature being maintained between about room temperature and 200° F. In that patent, the amount of catalyst to be used is broadly stated as 1–5%, or more, and the amount of chlorine in chlorinated wax is broadly stated as 10–20%, or more, although the only specific amount of aluminum chloride disclosed is 1.4% and the only specific chlorine contents stated are 11%, 13% and 15%. The products prepared were shown to be good pour depressors for waxy lubricating oils.

It has now been found that by using the same general process but by increasing the reactivity as controlled by the chlorine content of the chlorinated wax and the amount of aluminum chloride catalyst, condensation products can be made which have excellent viscosity-index improving properties and usually also have good pour-depressing properties. This is not only a new and useful but a distinctly unexpected result because it has heretofore been thought that chlorwax-naphthalene condensation products could have no value for improving the viscosity index of lubricating oils.

A still further advantage of the present invention is that the new condensation products in question are not only polyfunctional in regard to lowering pour point and improving viscosity index but they also have oxidation-inhibiting and sludge-dispersing properties. These and other advantages of the invention will be more fully understood from the following description.

Broadly, the invention comprises using for the condensation process described above a chlorinated wax having a chlorine content of at least 15%, and preferably 20% to 30%, and an amount of aluminum chloride between the approximate limits of 0.5 and 5.0%, with the important additional requirement that the arithmetical product of the percent of catalyst, based on the weight of chlorinated wax, times the square of the percent by weight of the chlorine in the chlorinated wax should be at least 400. Although the exact mechanism of chemical reactions involved in this process is not well understood, it is believed that the success of the process depends to a substantial extent upon the use of a sufficient amount of aluminum chloride catalyst to cause proper reaction of the trichlorwax molecules in the chlorinated wax used as raw material. Examination of chlorinated waxes containing various amounts of chlorine indicates that although there is some trichlor product present with mono- and dichlor waxes in mixed products containing less than about 15% Cl, yet when the chlorine content is 15% or above the relative proportion of monochlor and dichlor waxes decreases sharply with a correspondingly great increase in the proportion of trichlor wax so that in chlorinated waxes containing 15% or over of chlorine the trichlor substituents are present in prepondering amount and at approximately 20% Cl content there is about 75% of trichlor substituent present. When the chlorine content reaches as high as 25%, there is relatively little mono- or di-substituent present. This is shown in the following table.

*Distribution of chlorinated products in a chlorinated 118° F. melting-point wax*

| Distribution | Per cent Cl in wax | | |
|---|---|---|---|
| | 10 | 16 | 21 |
| | Per cent by volume | Per cent by volume | Per cent by volume |
| Wax | 29.8 | 5.4 | 1.2 |
| Monochlorides | 24.0 | 12.4 | 6.4 |
| Dichlorides | 24.7 | 26.5 | 16.2 |
| Trichlorides | 19.0 | 55.0 | 75.9 |

This table represents an analytical distribution study of chlorinated waxes. The analyses were carried out by low temperature fractionation using acetone as a solvent.

In carrying out the present invention a large number of materials has been tested and found successful. In the class of aromatic compounds, napthalene has given outstandingly superior results and accordingly it is the preferred aromatic material to be used. However, other aromatic compounds have given fairly good results, especially with control of reaction conditions such as by the use of a relatively low proportion of solvent and a high proportion of catalyst, without, however, using very elevated temperatures unless necessary. Thus other aromatic compounds which may be used include benzene, phenol, beta-naphthol, diphenylene oxide, polymers of dihydronapthalene, such as a tetramer thereof, and diphenyl, as well as many other compounds analogous or equivalent thereto, as well as mixtures of two or more aromatic compounds, such, for instance, as found in coal tar fractions containing naphthalene, anthracene, and other polynuclear aromatic hydrocarbons and derivatives thereof.

Instead of using chlorinated paraffin wax, one may also use other halogenated high molecular weight aliphatic materials, such as chlorinated petrolatum, chlorinated beeswax, and chlorinated derivatives of substantially saturated aliphatic hydrocarbon polymers, such as chlorinated polyethylene.

Although aluminum chloride is believed the best catalyst both from the point of view of cost and efficiency, other Friedel-Crafts catalysts may be used if desirable, such as ferric chloride, titanium tetrachloride, boron chloride, or boron fluoride, or their mixtures.

The low molecular weight halogenated hydrocarbon solvent should be one which is inert under the condensation reaction conditions used. Preferably it should be a chlorinated hydrocarbon having not more than 4 carbon atoms and preferably containing 3 or more halogen atoms. Tetrachlorethane has been found to be especially suitable, although dichlor benzene, trichlorethane, ethylene dichloride, trichlor benzene, etc., may be used, if desired. Although this solvent does not actually enter into the chemical condensation reaction, nevertheless it has a definite influence on the course of the reactions because if a hydrocarbon solvent such as refined kerosene is used instead of chlorinated hydrocarbon solvent, in a condensation involving a chlorinated wax containing 20% or more chlorine, the resulting condensation product will consist almost entirely of a rubbery product which is completely insoluble in mineral oil.

Another important requirement for carrying out the present invention is the proper order of adding the ingredients, namely, the chlorinated wax must be added last in order to avoid formation of oil-insoluble condensation products when starting with a chlorinated wax containing 20% or more of chlorine.

The proportions of aromatic compound and chlorinated wax may be varied over a fairly wide range without seriously interfering with production of the desired viscosity-index improving property. For instance, usually from 1–10 mols of chlorinated wax may be used for one mol of aromatic compound, preferably about 3–8 mols of chlorinated wax may be used for one mol of aromatic compound. Since chlorinated wax is probably the most important raw material and is generally used in large amounts, one of the easiest ways to calculate the amount of various raw materials to be used is to base all calculations on 100 parts by weight or by volume of chlorinated wax and in such a case the amount of aromatic compound to be used should range from about 5 to 30 parts by weight, or preferably about 10 to 15 parts in the case of naphthalene. On this same basis, when using 100 parts of chlorinated wax by weight, the aluminum chloride or other catalyst to be used should be about 0.5 to 5.0%, or preferably about 1–3%. The amount of chlorinated hydrocarbon solvent to be used should be about 10 to 200 volumes, or preferably 20 to 100 volumes, for each 100 volumes of chlorinated wax.

The reaction temperature should be maintained below 200° F., except in a few particular instances where the aromatic compound is not very reactive, and preferably should range from room temperature to 150° F. The reaction time may vary over a fairly wide range depending upon the amount of catalyst and solvent as well as the reaction temperature but normally it should be within the approximate limits of 5 minutes and 10 hours, and preferably range from ¼ hour to 5 hours.

After the condensation reaction has been completed, which may usually be determined approximately by the degree of increase in the viscosity of the reaction mixture and/or the cessation of the liberation of any hydrogen chloride, the reaction mixture is then, for convenience, diluted with additional solvent, such as refined kerosene, or a chlorinated hydrocarbon solvent, such as tetrachlorethane or ethylene dichloride, and neutralized or hydrolyzed by adding water or an aqueous solution of caustic soda, or alcohol or any other suitable hydrolyzing agent or mixture of two or more of them. After the settling and removal of the sludge layer, the reaction product is then subjected to distillation, starting at either normal or reduced pressure, but in any case completing the distillation under substantially reduced pressure, such as by using fire and steam distillation or by vacuum distillation, in order to obtain the desired high molecular weight distillation residue, without causing any substantial cracking. If vacuum distillation is used, it may be controlled to an absolute pressure of between about 5 and 100 millimeters of mercury, preferably about 10 to 50 millimeters. Usually, whether fire and steam distillation is used or vacuum distillation, the final temperature to which the distillation is carried should be at least 350° F., and preferably at least 400° F., and it may be 500° F. or 600° F.

A few tests indicated that a vacuum distillation under an absolute pressure of about 20 to 50 millimeters of mercury carried up to a temperature of 330° F. gave distillation results substantially equivalent to fire and steam distillation carried up to about 380° or 400° F. If desired, the condensation product may be recovered as a blend in heavy lubricating oil, preferably a naphthenic base oil, by adding a small amount of a suitably high-boiling fraction to the reaction product just prior to or during the distillation.

The condensation product per se is a dark, viscous liquid soluble in hydrocarbon oils. As it undoubtedly is not all one single compound but is probably a mixture of a number of different compounds having slightly different structure, the mixed product may, if desired, be separated into different fractions by various suitable means, such as distillation, solvent extraction, etc., in order to recover one or more fractions which are especially potent in regard to viscosity-index improvement and/or pour depressing as well as oxidation-inhibiting and sludge-dispersing characteristics. The amount of addition agent to be used in lubricating oils may vary over a fairly wide range, such as from about 0.5% to 10% when it is desired to effect a substantial improvement in the viscosity index of the lubricating oil base stock, but it may be used in considerably smaller amounts, such as 0.5%, 0.1%, 0.05% or even 0.02%, when it is desired to use this addition agent merely for its pour-depressing or oxidation-inhibiting properties. An important advantage of this novel product, especially in contrast to any products of the prior art, is that it not only has good pour-depressing properties when used in small amounts, such as 0.1% or 0.5%, but also when used in very much larger amounts, such as 2% or 5% as may be desirable when using it to improve both viscosity index and pour point. Many previously known pour depressors are effective only in amounts less than 1% or 2% and are either ineffective or in some cases raise the pour point of the lubricating oil base stock when used in concentrations as large as 3%, 5%, 7%, or 10%.

The lubricating oil base stock to which the new condensation products of this invention may be added may be any of the common types capable of improvement either in respect to viscosity-index or lowering of the pour point, or both, such as Pennsylvania type oils or other oils of a paraffinic nature, or West Texas or other types of naphthenic base oils or Mid-Continent or similar mixed base oils. One may, of course, use any desired particular fractions or others separated from these various crudes by known methods, such as distillation, solvent extraction, etc., and one may use oil base stocks which have been refined by various known methods, such as, clay-treating, acid-treating, propane dewaxing, etc.

The relative effectiveness of the condensation products of the present invention as compared to several materials of the prior art in regard to their effect on pour point and viscosity index, are shown in the accompanying drawing which is a chart in which pour point data are plotted on the vertical or Y axis against viscosity index data on the horizontal or X axis. The lubricating oil base stock used in all of the tests referred to in this chart was a solvent-extracted Mid-Continent type of paraffinic oil having a Saybolt viscosity of 44.4 seconds at 210° F., a viscosity index of 114 and a pour point of —5° F.

In this chart four prior art materials are shown by dotted lines. Material A, a commercial pour depressor, when used in a concentration of 0.625% reduced the pour point from —5 to —17° F. and only changed the viscosity index from 114 to 115 and when used in 2.5% concentration gave the same pour point as the plain base stock, namely, —5° F. and still only slightly affected the viscosity index from 114 to 117. Material B, likewise a commercial pour depressor, reduced the pour point to —15° F. when used in a concentration of 0.25%, but when used in larger amounts, the pour point rose to —10, —5, and +5° F. when used respectively in concentrations of 0.5%, 0.625%, and 2.5%, the viscosity index in the meantime being only slightly affected (actually lowered) from 114 to 111 in the 2.5% concentration. Material D, on the other hand, marketed commercially as a viscosity-index improver but also stated to have pour-depressing properties, made substantial improvements in the viscosity index to 144, 153, and 157, respectively, in concentrations of 0.625%, 1.75% and 2.5%, but had negligible effect on the pour point until the concentration reached about 1.75% where the blend had a pour point of —15, but then it rapidly raised to —10° F. when the concentration was increased to 2.5%.

In strict contrast to the above prior art materials the novel condensation products of the present invention, several of which are identified by solid lines on the chart as $X_1$, $X_2$, etc., have reduced the pour point to as low as —25° F. and in some cases to —35° F., or lower, when used in concentrations of 2.5%, or in some cases as low as 0.625%, while at the same time effecting a very substantial increase in viscosity index from 114 to values ranging from 125 to 145, depending upon the particular sample tested. Thus, for instance, material $X_1$ when used in concentration of 0.625% lowered the pour point to —25° F. and raised the viscosity index to 120, and in 2.5% concentration lowered the pour point still further— to below —35° F. (the test was stopped at —35, although the solid point had still not been reached), and the viscosity index was raised further to 135. It is interesting to note that this same material when used in even higher concentration (5%) still produced a pour point below —35° F. and raised the viscosity index still higher to 143. Another sample of the product of this invention, $X_2$, showed a pour point of below —35° F. in concentrations of both 2.5% and 5.0% and showed a viscosity index of 131 and 139 for those same two concentrations. Another sample, $X_3$, produced pour points below —35° F. for both 2.5% and 5.0% concentrations and gave a viscosity index of 127 and 134 for those same concentrations. It is apparent that these three samples, $X_1$, $X_2$, and $X_3$, are all extremely potent pour depressors while at the same time being quite effective viscosity-index improvers. On the other hand, samples $X_4$ and $X_5$ are perhaps not quite as potent in pour-depressing properties as samples $X_1$, $X_2$, and $X_3$ because in both the 2.5% and the 5.0% concentrations the $X_4$ gave a pour point of —30° F., and $X_5$ gave a pour point of —25° F., but are somewhat superior thereto in respect to viscosity-index improvement because $X_4$ and $X_5$ both produced a viscosity index of 137 in a 2.5% concentration and 144 in a 5.0% concentration.

It is thus obvious that the products of this invention are in an entirely different field than the products of the prior art. Also it is evident both from the data referred to above, plotted graphically on the drawing, and to the additional tabulated data to be discussed later, that the present invention offers wide possibilities for making products having various, desired, controlled ratios of pour-depressing and viscosity-index improving properties by properly adjusting the proportions of raw materials and the reaction conditions. It is believed that the possibility of obtaining products having such a wide range of characteristics is due primarily to the fact that the trichloro-substituted wax molecule is capable of condensing in what might be termed "three-dimensional directions." It is probable that the relative amount of pour-depressing and viscosity-index improving properties imparted to the condensation product depend to some extent, at least, upon the relative amount of linear type and cyclic or mesh type of condensation and that this latter type in turn depends primarily upon the proportion of trichloro substituents in the chlorinated wax and upon the amount of aluminum chloride, although undoubtedly the temperature, kind and amount of solvent and the reaction time have also some effect upon the chemical structure of the resulting condensation product.

The products of this invention are not only useful for improving the viscosity index and the pour point of lubricating oils having relatively high viscosity index, but are also useful for improving the viscosity index of oils having a relatively low viscosity index, such as —50, —100, etc. The following table shows the effect on viscosity index and viscosity at 210° F. of various amounts of the condensation product of this invention in two different low V. I. oils: (1) an ink oil having a —84 viscosity index, and (2) a light lubricating oil base stock having a —3 viscosity index.

*Improvement in low V. I. oils*

| Blend oil | Per cent blender | Vis./210 | V. I. |
|---|---|---|---|
| Ink oil | | 54.1 | —84 |
|  | 2.5 | 80.3 | 46 |
|  | 5.0 | 107.2 | 81 |
|  | 10.0 | 227.0 | 116 |
| Light lubricating oil | | 43.9 | —3 |
|  | 2.5 | 53.4 | 76 |
|  | 5.0 | 68.9 | 110 |
|  | 10.0 | 122.0 | 125 |

In addition to the primary use suggested above for the products of this invention, namely, as addition agents to mineral lubricating oils, it is also possible to use them as addition agents in other petroleum fractions, such as gasoline, kerosene, fuel oil, waxes, etc., in which case they may, of course, be used in either relatively small amounts, e. g., .02% to 1%, merely for pour-depressing effects, or in substantially larger amounts, e. g., from 1% to 10%, or so, for raising the viscosity index or otherwise improving the oils. If desired, these products may also be used as dewaxing aids for assisting in the removal of wax from lubricating oil stocks containing large amounts of paraffin wax.

In order to show more clearly the effect of various proportions of raw materials and the effect of various reaction conditions on the chemical reactions involved in the present invention, the following table of experimental data is given. In all of these tests the aromatic compound, aluminum chloride, and the solvent were first mixed together in a suitable reaction container and then the chlorinated wax was added last, in each case using 600 cc. of chlorinated wax. The tests are tabulated primarily in order, with those using naphthalene first as indicated in column 2, and those using the least amount of naphthalene as in column 3, and then the tests using the same amount of naphthalene are in order according to the melting point of the wax used for making the chlorinated wax, as indicated in column 4, ranging from the lowest to the highest, and similarly the tests made with a wax of any one melting point, such as 121° F., are then further arranged according to the percentage of chlorine in the chlorinated wax, as indicated in column 5, ranging from the lowest amount of chlorine to the highest, and using the same order of arrangement as to the remaining columns having to do with raw materials and reaction conditions or procedure, namely, columns 6–13.

*Table*

| Run No. | Aromatic Kind | Aromatic G. | Cl-wax Wax M.P., °F. | Cl-wax Per cent Cl | Solvent T.C.E., cc. | AlCl$_3$, g. | Reaction °F. | Reaction Hrs. | Distillation Vac. mm. Hg | Distillation Steam °F. on— | Distillation Max., °F. | Distillation Hrs. held |
|---|---|---|---|---|---|---|---|---|---|---|---|---|
| 1 | C$_{10}$H$_8$ | 51 | 121 | 21 | 234 | 10 | 125 | ¾ | | | 500 | ½ |
| 2 | do | 51 | 121 | 21 | 234 | 10 | 125 | 4 | | | 600 | |
| 3 | do | 69 | 114 | 21 | 176 | 8.2 | 125 | 6 | | 400 | 500 | |
| 4 | do | 69 | 114 | 21 | 234 | 7.2 | 125 | 5 | | | 600 | 2 |
| 5 | do | 69 | 114 | 21 | 234 | 8.2 | 125 | 5 | | | 600 | 2 |
| 6 | do | 69 | 114 | 21 | 234 | 15.0 | 125 | 5½ | | 370 | 500 | |
| 7 | do | 69 | 114 | 21 | 351 | 15 | 125 | 3 | | | 500 | ½ |
| 8 | do | 69 | 114 | 21 | 351 | 20 | 125 | 3 | | | 500 | ½ |
| 9 | do | 69 | 114 | 21 | 351 | 20 | 125 | 3 | x | | | |
| 10 | do | 69 | 114 | 21 | 351 | 25 | 125 | 3 | x | | | |
| 11 | do | 69 | 121 | 16 | 290 | 17 | 125 | ½ | | 320 | 450 | |
| 12 | do | 69 | 121 | 19 | 290 | 17 | 85 | 2 | | 400 | 500 | ½ |
| 13 | do | 69 | 121 | 19 | 290 | 17 | 125 | 4 | | 400 | 500 | ½ |
| 14 | do | 69 | 121 | 21 | 175 | 11 | 125 | 1½ | | 290 | 600 | |
| 15 | do | 69 | 121 | 21 | 234 | 8 | 125 | 1½ | | 400 | 500 | ½ |
| 16 | do | 69 | 121 | 21 | 234 | 8 | 125 | 2–3 | 20–50 | | 330 | |
| 17 | do | 69 | 121 | 21 | 234 | 8 | 125 | 2–3 | | 350 | 450 | 1 |
| 18 | do | 69 | 121 | 21 | 234 | 8 | 125 | 2–3 | | 350 | 550 | ½ |
| 19 | do | 69 | 121 | 21 | 234 | 8 | 125 | 2–3 | | 350 | 650 | ½ |
| 20 | do | 69 | 121 | 21 | 234 | 8 | 125 | 2–3 | | 370 | 400 | 1 |
| 21 | do | 69 | 121 | 21 | 234 | 8 | 125 | 2–3 | | 370 | 500 | ½ |
| 22 | do | 69 | 121 | 21 | 234 | 8 | 125 | 2–3 | | 370 | 600 | ½ |
| 23 | do | 69 | 121 | 21 | 234 | 8 | 125 | 5½ | x | | | |
| 24 | do | 69 | 121 | 21 | 234 | 8 | 125 | 6 | | 400 | 500 | ½ |
| 25 | do | 69 | 121 | 21 | 234 | 10 | 125 | ½ | x | | | |
| 26 | do | 69 | 121 | 21 | 234 | 10 | 125 | ½ | | 400 | 600 | 2 |
| 27 | do | 69 | 121 | 21 | 234 | 15.4 | 85 | ½ | | 300 | 450 | |
| 28 | do | 69 | 121 | 21 | 351 | 10 | 125 | 2 | | 320 | 600 | 1 |
| 29 | do | 69 | 121 | 21 | 351 | 10 | 125 | 3 | | 330 | 410 | |
| 30 | do | 69 | 121 | 21 | 351 | 15 | 85 | 4½ | | 400 | 500 | ½ |
| 31 | do | 69 | 121 | 21 | 351 | 15 | 85 | 4½ | | 400 | 500 | ½ |
| 32 | do | 69 | 121 | 21 | 351 | 15 | 125 | 5½ | | 400 | 600 | 1 |
| 33 | do | 69 | 121 | 21 | 468 | 15 | 125 | 1¾ | | 400 | 600 | 1 |
| 34 | do | 69 | 121 | 21 | 468 | 20 | 125 | 2½ | 20–50 | | 300 | ¼ |
| 35 | do | 69 | 121 | 21 | 585 | 10 | 125 | 1 | | 400 | 500 | ½ |
| 36 | do | 69 | 121 | 25 | 234 | 10 | 125 | ½ | | 400 | 500 | ½ |
| 37 | do | 69 | 121 | 25 | 468 | 20 | 85 | 2½ | | 400 | 500 | ½ |
| 38 | do | 69 | 121 | 25 | 468 | 20 | 85 | 2¾ | | 400 | 500 | ½ |
| 39 | do | 69 | 121 | 26 | 175 | 7 | 125 | 2 | | 380 | 440 | |
| 40 | do | 69 | 121 | 26 | 234 | 7 | 125 | 4 | | 400 | 600 | |
| 41 | do | 69 | 133 | 21 | 234 | 8 | 125 | ¾ | x | | | |
| 42 | do | 69 | 133 | 21 | 351 | 8 | 125 | 2 | x | | | |
| 43 | do | 69 | 133 | 21 | 468 | 15 | 125 | ½ | x | | | |
| 44 | do | 69 | 142 | 21 | 351 | 8 | 125 | ¾ | x | | | |
| 45 | do | 69 | 142 | 21 | 351 | 8 | 125 | 1 | x | | | |
| 46 | do | 69 | 146 | 21 | 468 | 10 | 125 | ¼ | x | | | |
| 47 | do | 69 | 146 | 21 | 585 | 10 | 125 | 1¼ | x | | | |
| 48 | do | 69 | 146 | 26 | 527 | 10 | 125 | 1 | x | x | 500 | ½ |
| 49 | do | 102 | 121 | 21 | 234 | 10 | 125 | 1 | | x | 500 | ½ |
| 50 | do | 130 | 121 | 25 | 234 | 10 | 125 | 1 | | x | 600 | |
| 51 | C$_6$H$_6$ | 43 | 121 | 21 | 234 | 22 | 125 | 5 | | x | 600 | |
| 52 | Misc.[1] A | 78 | 121 | 21 | 234 | 15 | 325 | 5 | | x | 600 | |
| 53 | Misc. B | 70 | 121 | 21 | 291 | 17 | 125 | 1½ | | x | 600 | |
| 54 | Misc. C | 84 | 121 | 21 | 234 | 22 | 125 | 5 | | x | 600 | |
| 55 | Misc. C | 84 | 127 | 21 | 234 | 33 | 125 | 6 | | x | 600 | |
| 56 | Misc. C | 84 | 135 | 21 | 354 | 33 | 150 | 5 | | x | 600 | |

Table—Continued

| Run No. | Yield, g. | 2.5% conc. | | | 5.0% conc. | | | Remarks |
|---|---|---|---|---|---|---|---|---|
| | | Vis./210 44.4 | V. I. 114 | P. p., °F. −5 | Vis./210 | V. I. | P. p., °F. | |
| 1 | 586 | 47.9 | 128 | | 55.6 | 142 | | |
| 2 | 338 | 52.4 | 132 | | 55.1 | 135 | | |
| 3 | 498 | 47.0 | 122 | | 50.2 | 129 | | |
| 4 | 364 | 47.9 | 124 | −30 | 53.5 | 129 | −30 | |
| 5 | 319 | 46.9 | 120 | <−35 | 49.9 | 124 | −25 | |
| 6 | 376 | 49.6 | 130 | | 57.2 | 130 | | |
| 7 | 525 | 48.3 | 126 | <−35 | 54.0 | 134 | <−35 | |
| 8 | 552 | 49.8 | 132 | −35 | 56.7 | 135 | −25 | |
| 9 | 516 | 50.3 | 128 | <−25 | 60.5 | 139 | <−35 | |
| 10 | 497 | 50.9 | 131 | <−35 | 63.0 | 141 | <−35 | |
| 11 | 529 | 49.2 | 131 | −30 | 56.1 | 139 | −25 | |
| 12 | 462 | 49.5 | 129 | <−35 | 55.7 | 134 | <−35 | 1.25%=123 V. I., −30 p. p. |
| 13 | 462 | 48.2 | 124 | | 51.9 | 127 | | |
| 14 | 392 | 46.7 | 123 | | 49.3 | 129 | | |
| 15 | 530 | 48.7 | 127 | −35 | 53.5 | 134 | −35 | |
| 16 | 261 | 49.4 | 130 | | 56.5 | 138 | | |
| 17 | 245 | 48.8 | 129 | | 54.2 | 134 | | Lightning mixer. |
| 18 | 215 | 47.7 | 123 | | 51.7 | 129 | | |
| 19 | 193 | 46.7 | 126 | | 49.6 | 126 | | |
| 20 | 252 | 49.1 | 129 | | 55.4 | 137 | | |
| 21 | 243 | 48.6 | 128 | | 53.6 | 134 | | |
| 22 | 184 | 48.1 | 125 | | 52.8 | 130 | | |
| 23 | 522 | 49.4 | 130 | <−35 | 56.5 | 138 | <−35 | 1.25%=124 V. I., −20 p. p. |
| 24 | 524 | 48.3 | 127 | | 52.8 | 133 | | |
| 25 | 536 | 48.8 | 129 | −35 | 55.3 | 138 | <−35 | |
| 26 | 280 | 50.1 | 129 | | 56.4 | 132 | | |
| 27 | 564 | 50.6 | 136 | −20 | 52.5 | 138 | −25 | |
| 28 | 286 | 51.9 | 132 | −15 | 64.1 | 140 | −10 | |
| 29 | 525 | 51.5 | 135 | | 60.7 | 143 | | |
| 30 | 531 | 46.4 | 120 | −20 | 49.0 | 128 | −30 | Lightning mixer. |
| 31 | 532 | 47.5 | 123 | <−35 | 51.5 | 131 | <−35 | Anchor mixer. |
| 32 | 312 | 48.3 | 125 | | 53.6 | 129 | | |
| 33 | 254 | 51.4 | 128 | | 62.2 | 136 | | |
| 34 | 525 | 50.7 | 134 | −25 | 59.2 | 141.5 | −20 | |
| 35 | 532 | 48.9 | 130 | | 55.1 | 136 | | |
| 36 | 464 | 46.6 | 120 | | 49.2 | 125 | | Do. |
| 37 | 512 | 48.0 | 128 | | 52.1 | 131 | | Lightning mixer. |
| 38 | 435 | 48.7 | 132 | | 53.5 | 138 | | |
| 39 | 379 | 48.4 | 124 | | 53.0 | 127 | | |
| 40 | 495 | 50.4 | 138 | | 57.1 | 145 | | |
| 41 | 472 | 50.3 | 131 | −30 | 58.8 | 140 | <−35 | |
| 42 | 608 | 51.5 | 134 | | 63.2 | 145 | | |
| 43 | 554 | 49.2 | 131 | | 55.8 | 138 | | |
| 44 | 480 | 50.8 | 137 | −25 | 58.9 | 144 | −25 | |
| 45 | 548 | 50.2 | 133 | | 59.4 | 141 | | |
| 46 | 542 | 52.1 | 136 | | 66.2 | 145 | | |
| 47 | 554 | 51.4 | 134 | | 63.9 | 144 | | |
| 48 | 417 | 49.1 | 127 | | 54.4 | 132 | | |
| 49 | 532 | 48.9 | 130 | −10 | 55.1 | 136 | −15 | |
| 50 | 223 | 47.1 | 120 | | 50.6 | 126 | | |
| 51 | 300 | 47.1 | 119 | | 48.4 | 121 | | |
| 52 | 208 | 48.3 | 127 | −15 | 52.6 | 130 | −15 | |
| 53 | 349 | 47.5 | 124 | −15 | 51.3 | 129 | | |
| 54 | 424 | 49.9 | 128 | −15 | 57.6 | 135 | | |
| 55 | 455 | 50.1 | 130 | −20 | 54.7 | 131 | | |

[1] Miscellaneous aromatic materials:
 A=B-naphthol—$C_{10}H_7OH$
 B=Tetramer of dihydronaphthalene
 C=Diphenyl In the above table it is apparent that a wide variation in raw materials and reaction conditions can be used to obtain wax-aromatic condensation products having the novel feature of being good viscosity-index improvers, and at the same time most of those products which have been tested for pour-depressing property are also found to be potent pour depressors even in the relatively large amounts, such as 2.5% and 5.0% used for obtaining viscosity-index improvement.

A comparison of certain individual tests indicates to some extent how the proportions of materials and reaction conditions affect the yield and nature of the resulting products. For instance, in tests 4 and 5 all of the factors represented in columns 2–13 were identical, except in column 7 where the amount of aluminum chloride is shown as 7.2 grams in test 4, and 8.2 grams in test 5, and accordingly the indications are that the slightly lower amount of aluminum chloride resulted in a slightly higher yield (364 as compared to 319 grams), a slightly higher viscosity at 210, and a slightly higher viscosity index (124 as compared to 120 in 2.5% concentration. and 129 as compared to 124 in 5.0% concentration). It should be kept in mind, however, that such a specific conclusion must be considered as being valid only when all of the other factors represented in columns 2–6 and 8–13 are maintained as are reported. For instance, in tests 7 and 8, where a larger amount of solvent (351 cc.) was used as compared to 234 cc. in tests 4 and 5, where the reaction time was 3 hours instead of 5 hours, and where the product was recovered by steam distillation to 500° F. for ½ hour instead of to 600° F. for 2 hours, all of the reaction factors were identical for both tests 7 and 8, except for the amount of aluminum chloride reported in column 7, which in this instance showed that compared to 15 grams of aluminum chloride a slightly larger amount, namely, 20 grams resulting in a slightly higher yield, slightly higher viscosity at 210, slightly higher viscosity index and definitely better pour point (lower). Although this specific conclusion might at first appear contradictory to that made above in respect to tests 4 and 5, both conclusions can be considered corroborative on the basis that the solvent used has the effect of diluting the catalyst; and therefore, in tests 7 and 8 when a liberal amount of solvent is used, then a larger amount of catalyst must be used for best results, and perhaps the 8.2 g. under the conditions of test 5 is relatively a larger quantity than even 20 g. under the conditions of test 8.

From the results of tests 16–22, it is apparent that with the materials and reaction conditions reported in columns 2-9, the best results in viscosity-index improvement are obtained by not carrying the maximum distillation temperature much above 400° F. when using fire and steam distillation, and keeping it even slightly lower when using vacuum distillation at 20-50 millimeters of mercury at absolute pressure.

Some other general conclusions which appear warranted from the experimental data available thus far are:

(1) That for the purposes of this invention, naphthalene appears to be the most suitable of all the aromatic compounds tested;

(2) That changes in the proportions of aromatic compound to chlorinated wax have relatively less influence on the yield and nature of the resulting products than do some of the other factors listed in columns 4-13;

(3) That good results in viscosity-index improvement as well as in pour-depressing properties can be obtained with chlorinated wax derived fom paraffin wax having a melting point ranging anywhere from 114° to 146° F., with perhaps slightly better results obtained from the higher melting point waxes, e. g., 130° to 146° F. compared to 114° to 121° F.;

(4) That fairly good results in both viscosity-index improvement and pour-depressing have been obtained with chlorinated waxes containing 16% and 19% of chlorine, providing a sufficient amount of aluminum chloride (e. g., about 2.5% or more) is used; in general, either better results are obtained or good results are obtained in an easier manner by the use of chlorinated wax containing substantially more than 20% of chlorine, such as 21%, 25%, or 26%;

(5) Usually within reasonable limits, the less solvent the more potent will be the viscosity index of the product, although, of course, there are exceptions in cases where substantially larger amounts of catalyst were used, or some other factor was substantially varied;

(6) It appears that the principal effects of raising the temperature from 85° to 125° F. is to speed up the chemical reaction activity in general, but it should also be mentioned that, from other tests not reported, it has been found that when using naphthalene as the aromatic compound, as the temperature is raised above 150° F., the viscosity-index improving potency is gradually reduced, which is probably due to the acceleration of side reactions or the production of undesirable condensation products;

(7) Since some of the best results were obtained with a reaction time as short as ½ hour as in test 42, or even ¼ hour, as in test 40, and yet fairly good results have also been obtained with a reaction time of 2 hours as in test 41, and 3 hours in test 29, it is apparent that the optimum reaction time depends to a substantial extent upon some of the other important factors, such as the temperature, the amount of aluminum chloride and the volume of solvent;

(8) In some cases it has appeared best to use a mixing apparatus having a revolving blade which scrapes adhering material away from the side walls, rather than merely mixing a relatively small volume of liquid in the interior part of the body of the reaction liquid. This is probably especially true in cases where either due to the high viscosity of the condensation product being formed, or due to the relatively low volume of solvent used, the reaction liquid has become exceedingly viscous.

Inspection of the results tabulated in the above table also show that the products of this invention produce a relatively large increase in viscosity index for any particular increase in viscosity at 210° F.; this is important because it is desirable to effect as great a rise in viscosity index as possible with the least amount of actual thickening.

Although in the above table the pour test data are all given in respect to a single oil base stock having a pour point of −5° F., the products of this invention are potent pour depressors in general and may be used with lubricating oil base stocks of various types, such as those derived from various crudes by distillation, solvent extraction, etc., and also base stocks obtained by dewaxing treatments of waxy oil stocks to various pour points, such as +30° F., +10° F., −5° F., etc.

Tests indicate that the novel condensation products of this invention also show relatively good resistance to viscosity breakdown under severe mechanical working conditions.

In a carbon black dispersion test which has been recognized as fairly indicative of sludge dispersing properties, the novel condensation product of this invention was found to be quite effective, and, in fact, slightly superior to a material heretofore marketed commercially solely for its sludge dispersing characteristics.

*Table*

| Blend | Clear oil (ccs. after 24 hrs.) | Dispersion reading (mg. carbon black/cc.) after 24 hrs. |
|---|---|---|
| Oil A [1] | 178 | Nil |
| Oil A [1]+4% commercial sludge disperser | None | 24.0 |
| Oil A [1]+3.5% of product of this invention | None | 28.5 |

[1] Refined mineral oil base stock, S. A. E. 10.

The novel condensation product of this invention also was tested for oxidation-inhibiting effect as determined in the Indiana Life test with the following results.

*Indiana life test*

| Blend | Hrs. life | Varnish on glass plate after 48 hrs. (mg.) |
|---|---|---|
| Oil B | 36 | 4.8 |
| Oil B+0.8% material M [1] | 37 | 4.2 |
| Oil B+2.8% present product | 97 | 0.3 |
| Oil B+0.7% material M [1]+0.35% present product | 65 | 0.3 |

[1] Prior art commercial viscosity-index improver.

Thus the present product not only is effective in increasing the hours of life in the Indiana test and in reducing the amount of varnish formed, but even small amounts of it are relatively quite effective in that respect even in the presence of substantial amounts of other addition agents, such as the prior art commercial viscosity-index improver M, tested both in combination with the present product and also alone for comparison.

In preparing lubricating oil compositions or various other types of compositions containing the novel condensation products of this invention, other addition agents already known to the art may also be incorporated, if desired, for instance, dyes, soaps, etc., as well as other materials having thickening, viscosity-index improving, pour-depressing, anti-oxidant and/or sludge-dispersing properties.

It is not intended that this invention be unnecessarily limited to the specific materials which have been recited as illustrative of a class, nor unnecessarily by any theory as to the mechanism of the complex chemical reactions involved in this invention, but only by the appended claims in which it is desired to claim all novelty inherent in the invention.

We claim:

1. The process of condensing a halogenated high molecular weight aliphatic material having more than 10 carbon atoms and containing at least 15% of halogen with an aromatic compound to make a higher molecular weight condensation product, which comprises mixing together the aromatic compound, about 0.5–5.0% of a Friedel-Crafts catalyst based on the weight of high molecular weight halogenated aliphatic material, and a low molecular weight halogenated hydrocarbon solvent inert under the reaction conditions, adding the halogenated high molecular weight aliphatic material and maintaining the mixture at a reaction temperature until the reaction is completed, the arithmetical product of the percent of catalyst, based on the weight of halogenated high molecular weight aliphatic material, times the square of the percent by weight of halogen in the halogenated high molecular weight aliphatic material being at least 400.

2. Process according to claim 1 in which the reaction temperature is maintained between the approximate limits of 70° and 150° F.

3. Process according to claim 1 in which the halogenated high molecular weight aliphatic material used is a chlorinated paraffin wax containing 15–30% of chlorine.

4. Process according to claim 1, using chlorinated paraffin wax containing 21–30% of chlorine, and 1–5% of aluminum chloride based on the weight of chlorinated paraffin wax.

5. Process according to claim 1 in which the halogenated, high molecular weight aliphatic material used is a chlorinated material of which the major proportion consists of molecules containing three chlorine atoms.

6. The process which comprises mixing together naphthalene, aluminum chloride and a low molecular weight halogenated hydrocarbon solvent inert under the reaction conditions, adding thereto a chlorinated wax containing 15–30% of chlorine, the amount of aluminum chloride being about 0.5–5.0% by weight based on the chlorinated wax, the amount of solvent being 10–200 volumes per 100 volume of chlorinated wax, and maintaining a reaction temperature below 200° F., the arithmetical product of the percent of aluminum chloride, based on the weight of chlorinated wax, times the square of the percent by weight of chlorine in the chlorinated wax being at least 400.

7. Process according to claim 6, using 1–10 mols of chlorinated wax containing substantially more than 20% chlorine, 1 mol of naphthalene, 20–100 volumes of inert solvent per 100 volumes of chlorinated wax, and a reaction temperature of about 70–150° F.

8. Process according to claim 6 using about 3–8 mols of chlorinated paraffin wax containing 21–30% of chlorine, 1 mol of naphthalene, 20–100 volumes of tetrachlorethane per 100 volumes of chlorinated wax, and a reaction temperature of about 70–150° F.

9. The process which comprises mixing together naphthalene, aluminum chloride and tetrachlorethane and adding thereto chlorinated paraffin wax containing about 25% chlorine, using about 3–8 mols of chlorinated wax per mol of naphthalene, about 1–3% of aluminum chloride based on the chlorinated wax and about 20–100 volumes of tetrachlorethane per 100 volumes of chlorinated wax, and maintaining the reaction mixture at a temperature between the approximate limits of 70–150° F. for a reaction time of about ¼ to 5 hours.

10. Process according to claim 9 in which after the reaction, the reaction mixture is hydrolyzed, the catalyst sludge is removed and the reaction products are distilled under reduced pressure to obtain the desired wax-naphthalene condensation product as distillation residue.

11. Process according to claim 9 in which, after the reaction, the reaction mixture is treated with a hydrolyzing agent, settled and sludge removed therefrom, and the reaction products are distilled under steam distillation to an upper limit between the approximate limits of 400° F. and 600° F. to obtain the desired wax naphthalene condensation product as distillation residue.

12. A lubricant containing a major proportion of a hydrocarbon lubricating oil and a substantial amount of a product made by the process defined in claim 1.

13. A lubricating oil composition having a relatively low pour point and a relatively high viscosity index, comprising a major proportion of a hydrocarbon lubricating oil base stock having a relatively low viscosity index and a relatively high pour point and also containing about 0.5% to 10% of a product having viscosity-index improving and pour-depressing properties, made by Friedel-Crafts condensation of an aromatic compound with a halogenated high molecular weight aliphatic hydrocarbon having more than 10 carbon atoms and containing more than 15% of halogen, the arithmetical product of the percent of Friedel-Crafts catalyst, based on the weight of halogenated high molecular weight aliphatic hydrocarbon, times the square of the percent by weight of the halogen in the halogenated high molecular weight aliphatic hydrocarbon being at least 400.

14. A lubricating oil composition having a relatively low pour point and a relatively high viscosity index, comprising a major proportion of a hydrocarbon lubricating oil base stock having a relatively low viscosity index and a relatively high pour point and also containing about 0.5% to 10% of a product having both viscosity-index improving and pour-depressing properties made by Friedel-Crafts condensation of an aromatic compound with a halogenated high molecular weight aliphatic hydrocarbon having more than 10 carbon atoms and containing more than 15% of halogen, said product being made by the process consisting essentially of mixing together naphthalene, aluminum chloride and tetrachlorethane and adding thereto chlorinated paraffin wax containing about 25% chlorine, using about 3–8 mols of chlorinated wax per mol of naphthalene, about 1–3% of aluminum chloride based on the chlorinated wax and about 20–100 volumes of tetrachlorethane per 100 volumes of chlorinated wax, and maintaining the reaction mixture at a temperature between the approximate limits of 70–150° F. for a reaction time of about ¼ to 5 hours.

EUGENE LIEBER.
MARTIN M. SADLON.